United States Patent Office 2,992,189
Patented July 11, 1961

2,992,189
REACTIVATION OF SULFONATED HYDROGEN ION EXCHANGE RESIN CATALYSTS
Bernard S. Friedman, Chicago, and Fred L. Morritz, Park Forest, Ill., Carl D. Keith, Munster, Ind., and Robert R. Chambers, Park Forest, and John L. Gring, Homewood, Ill., assignors to Sinclair Refining Company, New York, N.Y., a corporation of Maine
No Drawing. Filed June 10, 1955, Ser. No. 514,694
3 Claims. (Cl. 252—413)

This invention relates to the regeneration of catalysts useful in the production of alcohols, or their mixtures by hydration of mono-olefins containing 2 to 4 carbon atoms and in the manufacture of ethers either through alcohol dehydration or condensation of alcohol and mono-olefin. More particularly, this invention is concerned with the regeneration of sulfonated hydrogen ion exchange resin catalysts which have become deactivated through use in these reactions.

It is known that low molecular weight mono-olefin materials such as relatively pure olefins and mixed streams, for instance, those normally produced in petroleum refineries, particularly propylene-propane and the butylenes-butane streams, can be converted to alcohols and ethers through contact with water in the presence of various catalysts. The reaction products contain alcohol, ether or their mixtures, and the proportion of each component present is dependent particularly upon the amount of water present in the reaction mixture and to a lesser degree upon the selection of other reaction conditions. The product can also contain unreacted olefins and olefin polymers, the latter usually being of relatively low molecular weight. Although the ether or the alcohol might be separated from the mixed reaction product and sold or employed as such, their mixture either with or without any olefin polymer produced is particularly useful as a gasoline blending component as the separate components of the product impart higher octane values to the blended gasoline. When desired, excess water can be removed from the hydration reaction product and the alcohol-containing reaction products, with or without excess or additional olefin, can be converted over catalysts to enhance the proportion of ether in the product.

In these hydration and alcohol conversion reactions, the sulfonated hydrogen ion exchange resins are particularly effective. These resins are generally high molecular weight materials containing a plurality of sulfonic acid groups. Among the resins which are useful are, for example, the aromatics such as sulfonated coals, sulfonated condensation products of phenol and formaldehyde, sulfonated polystyrene, sulfonated coumaroneindene polymers and sulfonated aliphatics such as sulfonated polyethylene. Relatively inexpensive sulfonated resins which can be employed in the reactions of this invention include those materials produced by the sulfonation of various petroleum materials such as petroleum residuals. The sulfuric acid sludges from lube oil treating or olefin alkylation are also useful. However, when these sulfonated sludges are employed as a fixed bed of solid catalyst they are preheated to a temperature sufficient to render them substantially water-insoluble. The sulfonated hydrogen ion exchange resins can be cross-linked with agents such as cyclopentadiene and divinylbenzene.

In some cases these various resins are available in neutralized form; however, before being employed in the reactions they must be activated with a strong mineral acid such as hydrochloric acid followed by water washing to remove contaminating ions.

When employing these sulfonated hydrogen ion exchange resins as catalysts in the hydration of olefins and conversion of alcohols to ethers, they become deactivated after a period of use. In the present invention the activity of these catalysts is enhanced through treatment of the deactivated catalyst with agents normally considered to be sulfonating agents. The sulfonating agent enhances the catalytic activity through some mechanism possibly including the removal of contaminating residues on the catalyst such as high molecular weight olefin polymers and the chemical modification of the deactivated catalyst. The sulfonated catalysts are employed in fixed bed or slurry form and either as particles consisting entirely of the resin or as particles formed by depositing the resin on various supports such as diatomaceous earth, silica gel, glass, etc.

The regeneration or reactivation of the sulfonated catalysts can be accomplished in several ways. For example, should the catalyst be employed as a fixed bed, the reaction can be discontinued and the catalyst contacted with a sulfonating agent. In this case the reactor is drained of water and liquid product present and the catalyst treated, with or without previous drying, with the sulfonating agent. When employing a sulfonating agent such as concentrated sulfuric acid which is generally at least of 95% strength, and it may be advantageous to first dry the catalyst to avoid excessive dilution of the acid. Another sulfonating agent which can be employed is chlorosulfonic acid; however, in this case the catalyst should be substantially devoid of water which converts the chlorosulfonic acid to sulfuric acid with the evolution of hydrogen chloride. Should it be desired to use sulfur trioxide as the sulfonating agent, it is feasible merely to drain the reactor of liquids and then rely upon the water absorbed on the catalyst to convert the $SO_3$ to concentrated sulfuric acid. Alternatively, the catalyst can be dried and then regenerated with dry $SO_3$. Gaseous sulfonating agents can also be employed to reactivate the sulfonated catalysts; for example, dilute mixtures of sulfur trioxide in an inert gas such as air or sulfur dioxide may be particularly desirable and in such cases the sulfur trioxide will generally constitute about 1 to 10 volume percent of the gas charged. Various mixtures of sulfur dioxide and oxygen are among the sulfonating agents which can be employed.

The catalyst may also be employed in slurry form in either a continuous or a batch process. In the case of batch processing the catalyst can be rejuvenated by contact with the sulfonating agent in the reactor after the reactor is drained similarly as described above. In processing where a portion of the catalyst is removed from the reactor on a continuous or periodic basis, it can be passed to a separate vessel and then reactivated through contact with the sulfonating agent. Of course any procedure can be used as long as the deactivated catalyst is contacted with the sulfonating agent after separation of the catalyst from the liquid materials of the reactor.

In reactivating the sulfonated hydrogen ion exchange resin catalysts, the length of time the treatment with the sulfonating agent is continued is dependent upon several factors, among which is, for example, the degree of activity to be restored to the catalyst. Most often when reactivating the catalyst it will be desirable to continue the treatment until as much as possible of the catalytic activity has been restored. Normally this point is reached when the sulfonating agent supplied to the reactor exits substantially unchanged from its original condition. Another factor which determines the length of the rejuvenating period is the particle size of the resin. The rate of diffusion of the sulfonating agent through the resin depends upon the particle size of the catalyst and when the catalyst exists as larger particles the length of time required for diffusion of the sulfonating agent is increased.

When reactivating the catalyst sufficient improvement in activity may be provided by merely sweeping the reactor with liquid sulfonating agent to remove catalyst contaminants such as olefin polymer. However, it is normally preferred to insure more effective reactivation by extending the treatment with the sulfonating agent over a substantial period of time to enhance the chances for such chemical changes as might be responsible for reactivation.

When rejuvenating the catalyst the temperatures required in contacting the catalyst with the sulfonating agent can vary widely. Ordinarily, effective treatment will not be obtained at temperatures below about 75° F. and the upper temperature limit is defined only by the point at which the resin is destructively carbonized. The pressure employed during the reactivation period can also vary widely, for instance from atmospheric pressure to any considered economically feasible. Preferably, the reactivation treatment is conducted at temperatures from about 180° to 330° F. and it is most convenient to employ atmospheric pressure. When employing higher temperatures the use of elevated pressure can be advantageous.

The conditions necessary to produce alcohols, ethers, or their mixtures by the catalytic hydration of $C_2$ to $C_4$ monoolefins and by the catalytic conversion of $C_2$ to $C_4$ alcohols can vary considerably according to the desires of the operator. In the reactions with which the present invention is concerned the catalyst exists in solid or liquid form, e.g., when employing certain low molecular weight sulfonated coumarone-indene resins, and the reactants are present either as vapors or liquids depending upon the conditions selected. When employing the sulfonated hydrogen ion exchange resins as catalysts, the reaction temperatures would normally be between about 50 to 175° C. while reaction pressures will generally vary from about 15 to 3000 p.s.i.g. or more. The space velocities employed can vary widely and in general will be from about 0.1 to 5 pounds of olefin per pound of catalyst per hour (WHSV).

As indicated, the feed to the hydration reaction is an olefin or mixture of olefins containing from 2 to 4 carbon atoms including the normal olefins and isobutylene. Relatively inexpensive sources of these olefins are the petroleum refinery $C_3$ and $C_4$ streams which contain respectively propane and propylene and butane and butylenes. As an example, the $C_3$ stream normally available at the refinery contains about 50 to 75% propylene with the remaining being substantially propane.

The reaction condition which has the most effect upon the distribution of ether and alcohol in the product of the olefin-hydration reaction is the water to olefin ratio. For increased alcohol formation the molar ratio of water to olefin is at least 1 to 1 with increased amounts of water assuring a larger formation of alcohol. When ether formation is to be increased the molar ratio of water to olefin is decreased and in particular is less than 0.5 to 1 and can be as low as 0.1 to 1 or less. In the conversion of alcohols to ethers, formation of ether can be increased by maintaining an alcohol to olefin molar ratio of at least 1 to 1, of course there need be no olefin present in the reaction.

The following examples serve to illustrate the present invention but they are not to be considered limiting.

*Example I*

100 grams of 14 to 20 mesh of sulfonated hydrogen ion exchange resin Amberlite IR–120(H) a solid polystyrene resin sulfonated with sulfuric acid, are placed in a tubular downflow reactor surrounded by a radiant heat furnace. A $C_3$ refinery stream containing about 66 weight percent propylene is passed to the reactor at the rate of 110 grams per hour. Water at the rate of 31 grams of water per hour is introduced into the feed line of the refinery gas stream leading to the reatcor. The reaction temperature is maintained at 300° F. and a pressure of 1000 p.s.i.g. is held on the reactor. The effluent stream from the reactor includes isopropyl alcohol, isopropyl ether, unreacted olefin, propane and excess water, and is stabilized by cooling to 60° F. and flashing to atmospheric pressure to separate propylene and propane. The remaining product liquid is predominantly isopropyl alcohol containing a substantial amount of isopropyl ether and water. This reaction is continued until the drop in olefin conversion indicates that the catalyst is substantially deactivated. At this point the olefin and water feed is stopped and the reactor drained. Dry propane is passed into the reactor until the catalyst is substantially dry. Then the reactor is filled with 98% sulfuric acid and the temperature of the reactor contents raised to 210° F. and maintained at this point until the sulfuric acid strength levels off. The reactor is drained of sulfuric acid and flushed with water to remove free sulfuric acid, and water-soluble sulfonates formed from entrained olefins on the catalyst. The reactor is then placed on stream and the catalyst exhibits a substantial increase in activity as evidenced by an increase in olefin conversion compared with that obtained just prior to the stopping of the reaction before the reactivation treatment.

*Example II*

An Amberlite IR–120(H) catalyst is deactivated substantially as described in Example I and upon draining of the reactor of liquid materials and without drying of the catalyst as with propane treatment, gaseous $SO_3$ is passed into the reactor whose contents are maintained at 210° F. and atmospheric pressure until the gaseous effluent indicates no substantial change from that introduced. The catalyst reactivated by treatment with sulfuric acid formed in situ with entrained water and the introduced $SO_3$ is then washed with water and placed on stream. An increase in activity is indicated by an increase in olefin conversion as compared with the conversion obtained just prior to shutdown of the reaction for catalyst reactivation.

*Example III*

An Amberlite IR–120(H) catalyst is deactivated and dried substantially as described in Example I. Then gaseous $SO_3$ is passed in at 1% concentration by weight in air while the contents of the reactor are maintained at 100° F. When one part by weight of $SO_3$ per part of resin has been passed into the resin in this manner, the regeneration procedure is stopped and the resin washed with water. The catalyst is then placed on stream again in contact with water and the olefin, and an increased activity is indicated by higher olefin conversion compared to those achieved with the resin immediately prior to regeneration.

*Example IV*

With the catalyst and reaction system as in Example I, a mixture of isopropyl ether, propylene and isopropyl alcohol is converted to a mixture richer in ether at 300° F. and 1000 p.s.i.g. until the catalyst is deactivated. Catalyst activity is restored as in Example I by $H_2SO_4$ treatment. After regeneration a greater conversion of alcohol to ether is obtained.

It is claimed:

1. The method of reactivating a sulfonated hydrogen ion exchange resin catalyst which has been deactivated by use in the hydration of mono-olefin containing 2 to 4 carbon atoms or in the conversion of alcohol containing 2 to 4 carbon atoms which comprises contacting the deactivated catalyst with a sulfonating agent selected from the group consisting of concentrated sulfuric acid and sulfur trioxide for a time sufficient to increase the activity of the deactivated catalyst.

2. The method of claim 1 wherein the sulfonating agent consists essentially of concentrated sulfuric acid.

3. The method of claim 1 wherein the sulfonating agent consists essentially of sulfur trioxide.

References Cited in the file of this patent

UNITED STATES PATENTS

| | | |
|---|---|---|
| 2,469,472 | Nachod et al. | May 10, 1949 |
| 2,689,229 | Kimberlin et al. | Sept. 14, 1954 |